United States Patent [19]

Moore

[11] Patent Number: 5,101,596
[45] Date of Patent: Apr. 7, 1992

[54] DOWNSTOP FOR WINDOW REGULATOR

[75] Inventor: Ronald G. Moore, Northville, Mich.

[73] Assignee: General Motors Corporation, Detroit, Mich.

[21] Appl. No.: 687,138

[22] Filed: Apr. 18, 1991

[51] Int. Cl.⁵ .............................................. E05F 11/44
[52] U.S. Cl. ........................................ 49/351; 49/349
[58] Field of Search .................. 49/351, 350, 349, 375

[56] References Cited

U.S. PATENT DOCUMENTS

| | | | |
|---|---|---|---|
| 4,825,594 | 5/1989 | Escaravage | 49/351 |
| 4,846,591 | 7/1989 | Dauvergne | 49/351 X |
| 4,924,627 | 5/1990 | Lam et al. | 49/351 |

Primary Examiner—Philip C. Kannan
Attorney, Agent, or Firm—Charles E. Leahy

[57] ABSTRACT

A lift arm is pivotally mounted on the motor vehicle and has an end which is connected to the sash channel by a roller or slide. As the lift arm is lowered, the lift arm pivots relative to the sash channel. A stop element in the form of a channel is carried by the sash channel and projects into overlying relationship with the lift arm so that the stop element comes into interfering engagement with the lift arm at a predetermined lowered position of the window to thereby prevent any further relative pivoting movement between the lift arm and the sash channel to thereby stop the window at the predetermined lowered position.

4 Claims, 2 Drawing Sheets

DOWNSTOP FOR WINDOW REGULATOR

The invention relates to a downstop for a vertically movable window and more particularly, to a downstop comprised of a stop element carried by the sash channel and coming into engagement with the lift arm of a cross arm window regulator to stop any further downward movement of the sash channel and window.

BACKGROUND OF THE INVENTION

Motor vehicles typically have windows which are vertically movable between raised and lowered positions. It is common to provide a downstop which is engaged by the window when it is fully lowered to the open position to prevent further downward movement of the window. These downstops are usually resilient members carried by a bracket which is welded or otherwise mounted to the body structure or the door of the vehicle. The downstop is engaged by the lower edge of the window when the window is fully lowered by the window regulator mechanism.

It is also known to provide a downstop on the sector gear of the window regulator to stop the window movement by stopping the rotation of the sector gear.

The aforedescribed prior art downstop has been successful in operation but requires a separate bracket to be assembled onto the vehicle door or the body structure. Accordingly it has been recognized as desirable to provide a downstop which would be accommodated within the window regulating mechanism itself to thereby obviate the need to attach any additional bracketry onto the vehicle door. In this regard, U.S. Pat. No. 4,924,627, assigned to the assignee of this invention, provided an elongated slider means which would be captured within the sash channel between the guides carried by the cross arms of the cross arm window regulator so that the slider mechanism would limit the extent to which the cross arms could come together and thereby limit the downward movement of the window.

It is also known to provide a downstop on the sector gear of the window regulator to stop the window movement by stopping the rotation of the sector gear.

The object of the present invention resides in the provision of a window regulator having a stop element projecting from the sash channel into overlying relationship with a lift arm of the regulator so that the stop element comes into engagement with the arm at a predetermined lowered position of the window to thereby prevent any further downward movement of the sash channel and the window.

According to the present invention, a lift arm is pivotally mounted on the motor vehicle and has an end which is connected to the sash channel by a roller or slide. As the lift arm is lowered, the lift arm pivots relative to the sash channel. A stop element in the form of a channel is carried by the sash channel and projects into overlying relationship with the lift arm so that the stop element comes into interfering engagement with the lift arm at a predetermined lowered position of the window to thereby prevent any further relative pivoting movement between the lift arm and the sash channel to thereby stop the window at a lowered position.

BRIEF DESCRIPTION OF THE DRAWINGS

These and other objects, features, and advantages of the invention will become apparent upon consideration of the description of the preferred embodiment and the appended drawings in which.

DESCRIPTION OF THE PREFERRED EMBODIMENT

Figure 1:
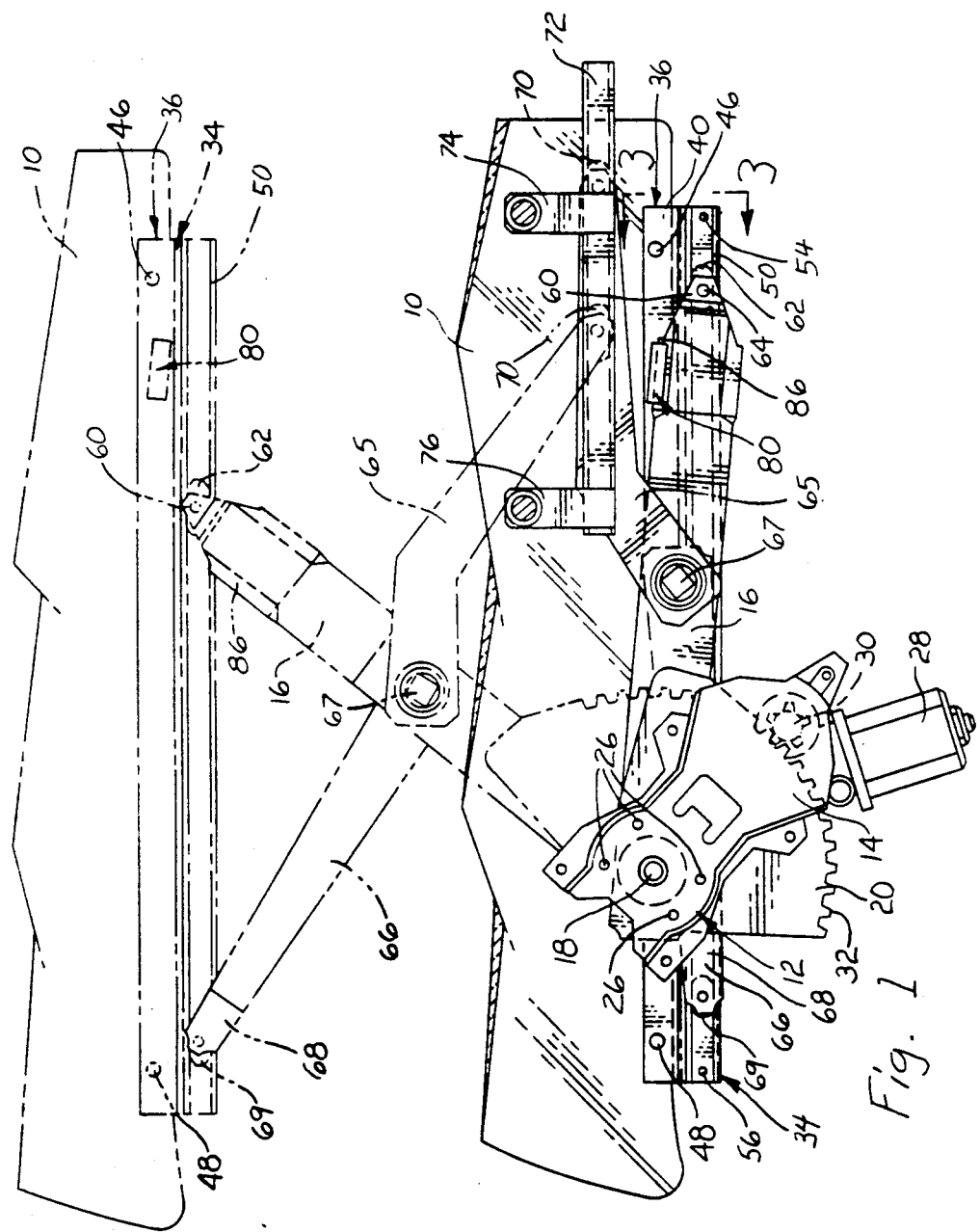
FIG. 1 is a side elevation view of a vehicle window and a cross arm window regulator mechanism and illustrating the preferred embodiment of the novel downstop of the present invention.

Referring to FIG. 1, it is seen that a motor vehicle window glass 10 is provided for movement between a solid line indicated lowered position and a phantom-line indicated raised position. The edges of the window glass 10 are conventionally captured within guide channels, not shown, which guide the path of up and down movement of the window 10.

Figure 2:
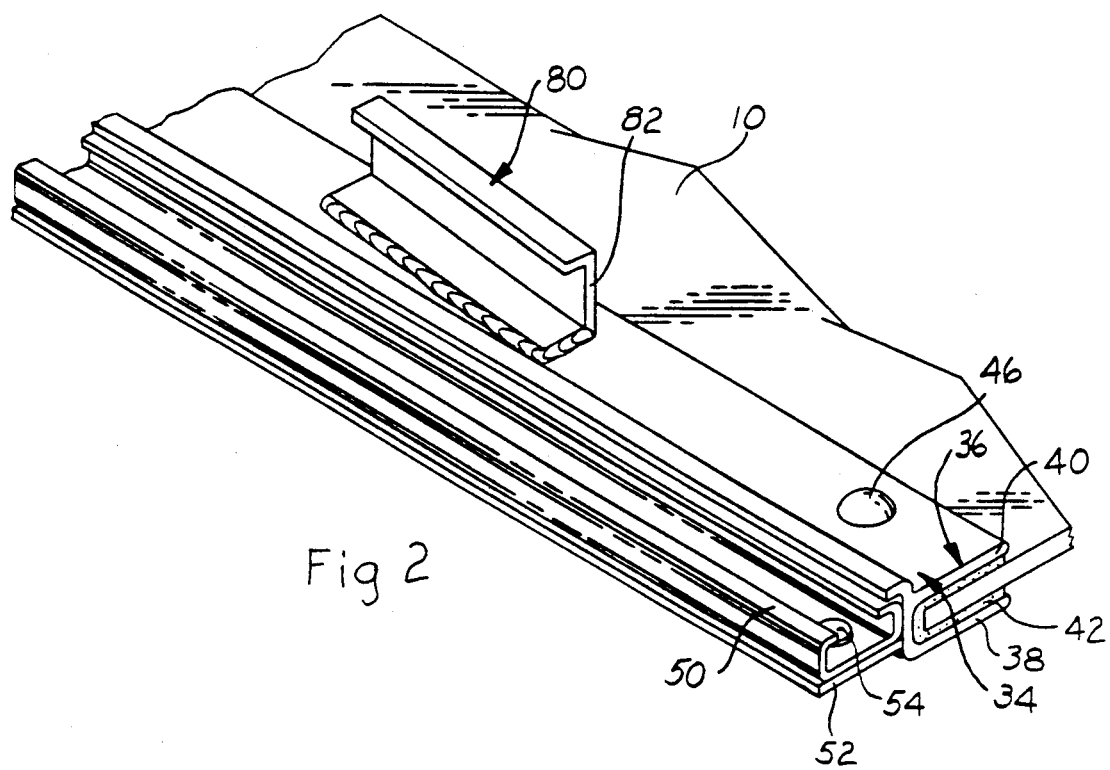
FIG. 2 is an enlarged fragmentary perspective view of the sash channel attached to the window and carrying the channel shaped stop element.
Figure 3:
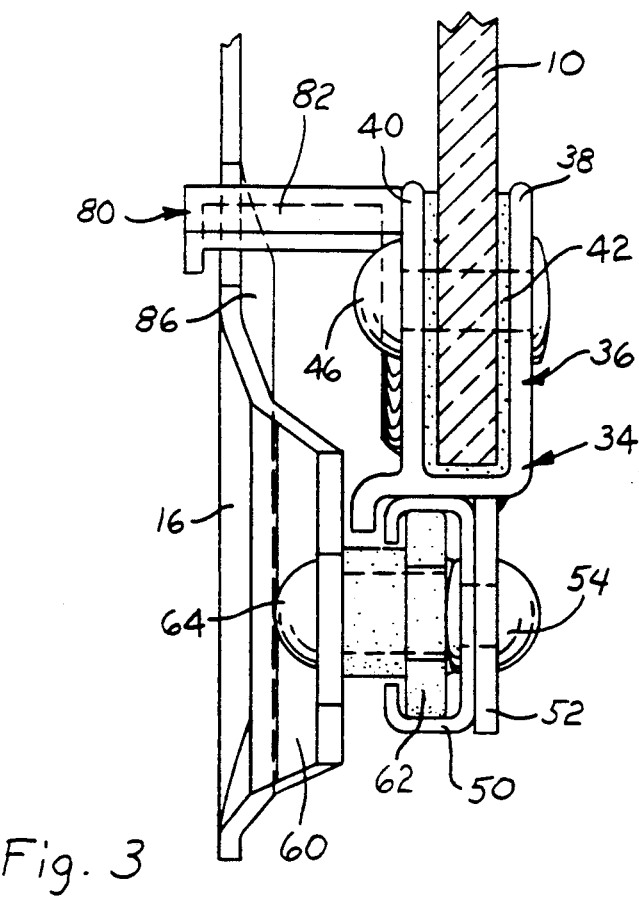
FIG. 3 is a section view taken in the direction of arrows 3—3 of FIG. 1.

A cross arm window regulator mechanism generally indicated at 12, is provided for raising and lowering the glass 10. The window regulator 12 includes a mounting bracket 14 which is suitably mounted either on the vehicle door or the vehicle body. A lift arm 16 is pivotally mounted on the mounting bracket 14 by pivot 18. A sector gear 20 is also mounted on the mounting bracket 14 by the pivot 18 and is connected to the lift arm 16 by rivets 26. A window lift motor 28 is mounted on the mounting bracket 14 and has a pinion gear 30 which meshes with teeth 32 carried by the sector gear 20. Accordingly, energizing the motor 28 causes the sector gear 20 and lift arm 16 to pivot about the pivot pin 18 so that the lift arm 16 moves the window 10 between the solid-line indicated lowered position of FIG. 1 and the phantom-line indicated raised position of FIG. 1. As best seen in FIGS. 2 and 3, a sash channel assembly generally indicated at 34 is carried by the bottom edge of the window 10. An extrusion 36 includes spaced apart legs 38 and 40 defining a channel in which the lower edge of the window glass 10 is captured. A suitable sealing and cushioning material 42 is situated between the extrusion 36 and window 10. Rivets 46 and 48 extend through the legs 38 and 40 and through the window 10 to securely attach the window 10 to the extrusion 36. The sash channel assembly 34 also includes a roll formed channel 50 of C-shaped cross section which is attached to a leg 52 of the extrusion 36 by rivets 54 and 56.

As best seen in FIG. 3, the lift arm 16 has an end 60 which is connected to the sash channel assembly 34 by a roller or slide 62. The slide 62 is preferably of a molded plastic construction and is slidably captured within the roll formed channel 50. The slide 62 is attached to the end 60 of the lift arm 16 by a rivet 64 which permits the slide 62 to rotate with respect to the lift arm 16.

As best seen in FIG. 1, the window regulator mechanism 12 also includes a pair of regulator arms 65 and 66 which each have ends pivotally attached to the lift arm 16 by a pivot pin 67. The other end 68 of regulator arm 66 is pivotally and slidably connected to the sash channel assembly 34 by a roller or slide 69 similar to the slide 62. The other end of the regulator arm 65 pivotally carries a slide 70 which is slidably and rotatably captured within a guide channel 72 mounted on the vehicle door or the vehicle body by mounting legs 74 and 76.

The regulator arms 65 and 66 assist the lift arm 16 in supporting and guiding the window 10 during its movement between the raised and lowered positions.

Referring again to FIG. 1, it is seen that the lowering of the window 10 from the phantom-line position will be achieved by pivotally lowering the lift arm 16 about the pivot pin 18 as permitted by energizing the lift motor 28 to rotate the sector gear 20. As the lift arm 16 is lowered, the slide 62 captured in the sash assembly sides progressively toward the right hand end of the sash channel assembly 34.

A stop mechanism is provided in order to stop the downward movement of the window 10 at the solid line indicated, fully lowered position of FIG. 1. This stop element is best shown in FIGS. 2 and 3 and includes a stop element 80 in the form of a channel section which is suitably attached to the extrusion 36 as by welding. As best seen in FIG. 3, this stop element 80 includes a leg 82 which projects laterally from the leg 40 of the extrusion 36 into overlying relationship with the lift arm 16. Accordingly, as seen in the lowered position of FIG. 1, the progressive lowering of the lift arm 16 and the sash channel assembly 34 eventually overtakes the lift arm 16 reaches the point where the stop element 80 is carried into engagement with the end of the lift arm 16. Because the lift arm interferes with the stop element 80, the lift arm 16 is prevented from further pivoting movement and the sash channel assembly 34 is blocked against any further downward movement.

As best seen in FIGS. 1 and 3, the edge of the lift arm 16 may be flanged at 86 in order to somewhat strengthen and rigidity the end of the lift arm 16 for its engagement by the stop element 80.

As best seen in FIG. 1, it will be appreciated that the lowered position of the window may be adjusted by changing the mounting location of the stop element 80 on the sash channel assembly 34.

In the preferred embodiment of the invention shown herein, the stop element 80 is positioned to come into engagement with the lift arm 16. However, it is within the scope of the invention to mount the stop element 80 on the sash channel assembly 34 adjacent the regulator arm 66 so that the lowering of the window will cause the stop element 80 to come into engagement with the end 68 of the regulator arm 66.

In order to quiet and cushion the lowered position of the window 10, a resilient rubber stop may be mounted on the stop element 80 or on the flange 86 of the lift arm 16.

Thus it is seen that the invention provides a novel, simple, and economical downstop for a cross arm window regulator which merely requires that a stop element such as a channel be attached to project from the sash channel assembly carried by the glass into overlying relationship with the regulator arm in order to engage with the regulator arm and thereby define the lowered position of the window. Although the preferred embodiment of the invention shown herein is a cross arm regulator, the invention may also be employed in window regulators of the type having a single lift arm.

The embodiments of the invention in which an exclusive property or privilege is claimed are defined as follows:

1. A window regulator for raising and lowering a motor vehicle window having a sash channel mounted adjacent its lower edge, comprising:
   a lift arm pivotally mounted on the motor vehicle and having an end;
   said sash channel having a C-shaped channel,
   connecting means carried by the end of the arm and slidably and pivotably captured within the C-shaped channel so that pivoting movement of the lift arm raises and lowers the window as permitted by the sliding and pivoting of the connecting means within the C-shape channel of the sash channel,
   and a stop element projecting laterally from the sash channel outside of the C-shaped, channel and becoming engaged with the lift arm independent of the connecting means as the lowering movement of the window progresses to the point where the downward movement of the stop element overtakes the downward pivoting movement of the lift arm to thereby stop the sash channel and window against any further lowering movement.

2. A window regulator for raising and lowering a motor vehicle window having a sash channel mounted adjacent its lower edge, comprising:
   a lift arm pivotally mounted on the motor vehicle and having an end;
   said sash channel having a C-shaped channel,
   connecting means carried by the end of the arm and slidably and pivotably captured within the C-shaped channel so that pivoting movement of the lift arm raises and lowers the window as permitted by the sliding and pivoting of the connecting means within the C-shaped channel of the sash channel,
   a regulator arm pivotally connected to the lift arm and having an end operably connected to the sash channel so that the regulator arm pivots relative the sash channel during raising and lowering of the window by the lift arm,
   and a stop element projecting laterally from the sash channel outside of the C-shaped channel and becoming engaged with the lift arm independent of the connecting means as the lowering movement of the window progresses to the point where the downward movement of the stop element overtakes the downward pivoting movement of the lift arm to thereby stop the sash channel and window against any further lowering movement.

3. The window regulator of claim 2 further characterized by said stop element being a channel shape attached to the sash channel and projecting away from sash channel into overlying relationship with the lift arm.

4. The window regulator of claim 3 further characterized by said lift arm having a flange on the edge thereof adapted to be engaged by the channel shaped stop element.

* * * * *